(12) United States Patent
Greitzer et al.

(10) Patent No.: US 7,457,785 B1
(45) Date of Patent: Nov. 25, 2008

(54) METHOD AND APPARATUS TO PREDICT THE REMAINING SERVICE LIFE OF AN OPERATING SYSTEM

(75) Inventors: Frank L. Greitzer, Richland, WA (US); Lars J. Kangas, West Richland, WA (US); Kristine M. Terrones, Los Alamos, NM (US); Melody A. Maynard, Richland, WA (US); Ronald A. Pawlowski, West Richland, WA (US); Thomas A. Ferryman, Richland, WA (US); James R. Skorpik, Kennewick, WA (US); Bary W. Wilson, Coconut Creek, FL (US)

(73) Assignee: Battelle Memorial Institute, Richland, WA (US)

( * ) Notice: Subject to any disclaimer, the term of this patent is extended or adjusted under 35 U.S.C. 154(b) by 932 days.

(21) Appl. No.: 10/362,717

(22) PCT Filed: Aug. 25, 2000

(86) PCT No.: PCT/US00/23389

§ 371 (c)(1),
(2), (4) Date: Aug. 18, 2003

(87) PCT Pub. No.: WO02/18879

PCT Pub. Date: Mar. 7, 2002

(51) Int. Cl.
*G06F 15/18* (2006.01)
(52) U.S. Cl. ...................................... 706/12
(58) Field of Classification Search ................ None
See application file for complete search history.

(56) References Cited

U.S. PATENT DOCUMENTS 4,442,494 A  4/1984  Fromson et al.

(Continued)

FOREIGN PATENT DOCUMENTS

EP         0 612 039         8/1994

(Continued)

OTHER PUBLICATIONS

A corollary to: Duane's postulate on reliability growth [avionics] Frank, D.G.; Reliability and Maintainability Symposium, 1989. Proceedings., Annual Jan. 24-26, 1989 pp. 167-170 Digital Object Identifier 10.1109/ARMS.1989.49594.*

(Continued)

*Primary Examiner*—Michael B Holmes
(74) *Attorney, Agent, or Firm*—Klarquist Sparkman, LLP

(57) ABSTRACT

A method and computer-based apparatus for monitoring the degradation of, predicting the remaining service life of, and/or planning maintenance for, an operating system are disclosed. Diagnostic information on degradation of the operating system is obtained through measurement of one or more performance characteristics by one or more sensors onboard and/or proximate the operating system. Though not required, it is preferred that the sensor data are validated to improve the accuracy and reliability of the service life predictions. The condition or degree of degradation of the operating system is presented to a user by way of one or more calculated, numeric degradation figures of merit that are trended against one or more independent variables using one or more mathematical techniques. Furthermore, more than one trendline and uncertainty interval may be generated for a given degradation figure of merit/independent variable data set. The trendline(s) and uncertainty interval(s) are subsequently compared to one or more degradation figure of merit thresholds to predict the remaining service life of the operating system. The present invention enables multiple mathematical approaches in determining which trendline(s) to use to provide the best estimate of the remaining service life.

35 Claims, 7 Drawing Sheets

U.S. PATENT DOCUMENTS

| | | | |
|---|---|---|---|
| 4,839,830 | A | 6/1989 | Amey et al. |
| 5,235,524 | A | 8/1993 | Barkhoudarian |
| 5,293,040 | A | 3/1994 | Watanabe et al. |
| 5,318,136 | A | 6/1994 | Rowsell et al. |
| 5,365,787 | A | 11/1994 | Page et al. |
| 5,447,059 | A | 9/1995 | Miller et al. |
| 5,492,781 | A * | 2/1996 | Degen et al. ............... 429/144 |
| 5,614,676 | A | 3/1997 | Dutt et al. |
| 5,625,664 | A * | 4/1997 | Berkley ..................... 378/72 |
| 5,684,404 | A | 11/1997 | Millar |
| 5,719,675 | A | 2/1998 | Killpatrick et al. |
| 5,864,183 | A | 1/1999 | Fisher, Jr. et al. |
| 6,158,286 | A | 12/2000 | Nguyen et al. |
| 6,169,931 | B1 | 1/2001 | Runnels |
| 6,206,646 | B1 | 3/2001 | Bucher |
| 6,351,713 | B1 | 2/2002 | Board et al. |
| 6,732,572 | B1 * | 5/2004 | Pickert et al. ............. 73/54.01 |
| 6,786,635 | B2 * | 9/2004 | Choi ......................... 374/153 |
| 6,847,854 | B2 * | 1/2005 | Discenzo .................... 700/99 |
| 6,850,824 | B2 * | 2/2005 | Breed ......................... 701/36 |
| 6,853,951 | B2 * | 2/2005 | Jarrell et al. ............... 702/181 |
| 6,862,927 | B2 * | 3/2005 | Craig et al. ............. 73/114.69 |
| 6,865,513 | B2 * | 3/2005 | Ushiku et al. .............. 702/184 |
| 6,920,779 | B2 * | 7/2005 | Carlstrom et al. ......... 73/53.05 |
| 6,944,572 | B2 * | 9/2005 | Ushiku et al. .............. 702/181 |
| 6,988,026 | B2 * | 1/2006 | Breed et al. .................. 701/29 |
| 7,004,206 | B2 * | 2/2006 | Viken et al. .................... 141/1 |
| 7,043,402 | B2 * | 5/2006 | Phillips et al. ............. 702/184 |
| 7,050,873 | B1 * | 5/2006 | Discenzo .................... 700/99 |
| 7,050,897 | B2 * | 5/2006 | Breed et al. .................. 701/46 |
| 7,086,503 | B2 * | 8/2006 | Miller et al. ........... 188/1.11 L |
| 7,088,255 | B2 * | 8/2006 | Ridolfo et al. ............. 340/635 |
| 7,089,099 | B2 * | 8/2006 | Shostak et al. ............... 701/32 |
| 7,103,460 | B1 * | 9/2006 | Breed ......................... 701/29 |
| 7,124,057 | B2 * | 10/2006 | Forster et al. ............... 702/183 |
| 7,164,117 | B2 * | 1/2007 | Breed et al. ................ 250/221 |
| 7,206,719 | B2 * | 4/2007 | Lindsay et al. ............. 702/177 |
| 7,210,981 | B2 * | 5/2007 | Yilmaz et al. ................. 451/8 |
| 7,235,750 | B1 * | 6/2007 | Coutu et al. ................ 200/181 |
| 7,283,934 | B2 * | 10/2007 | Deller et al. ................ 702/183 |
| 7,289,916 | B2 * | 10/2007 | Drnevich et al. .............. 702/43 |
| 7,292,954 | B2 * | 11/2007 | Deller et al. ................ 702/115 |
| 7,308,322 | B1 * | 12/2007 | Discenzo et al. .............. 700/28 |

FOREIGN PATENT DOCUMENTS

| | | |
|---|---|---|
| EP | 0 626 697 | 11/1994 |
| EP | 0 969 274 | 1/2000 |
| WO | WO 97/38292 | 10/1997 |
| WO | WO 99/60351 | 11/1999 |
| WO | WO 01/01213 | 1/2001 |
| WO | WO 01/44769 | 6/2001 |

OTHER PUBLICATIONS

Remaining Service Life Diagnostic Technology of Phenol Insulators for Circuit Breakers Miki, S.; Hasegawa, T.; Umemura, S.; Okazawa, H.; Otsuka, Y.; Matsuki, H.; Tsunoda, S.; Inujima, H.; Dielectrics and Electrical Insulation, IEEE Transactions on [see also Electrical Insulation, IEEE Transactions on] vol. 15, Issue 2, Apr. 2008 pp. 476-483.*

Partial discharge monitoring implementing 'hybrid'machine oriented algorithms Wai, C.K.L.; Bish, N.B.; Howson, P.A.; Lawrence, D.H.; Universities Power Engineering Conference, 2004. UPEC 2004. 39th International vol. 1, Sep. 6-8, 2004 pp. 242-245 vol. 1.*

Remaining life assessment of aging electronics in avionic applications Valentin, R.; Osterman, M.; Newman, B.; Reliability and Maintainability Symposium, 2003. Annual Jan. 27-30, 2003 pp. 313-318.*

Predicting transformer service life using simplified Perks' equation and Iowa curves Qiming Chen; Egan, D.M.; Power Engineering Society General Meeting, 2006. IEEE Jun.18-22, 2006 p. 7 pp. Digital Object Identifier 10.1109/PES.2006.1708916.*

Exploratory investigations for intelligent damage prognosis using hidden Markov models Roshan Rammohan; Taha, M.R.; Systems, Man and Cybernetics, 2005 IEEE International Conference on vol. 2, Oct. 10-12, 2005 pp. 1524-1529 vol. 2 Digital Object Identifier 10.1109/ICSMC.2005.1571363.*

Experience with EHV transformer retirements Egan, D.; Power Engineering Society General Meeting, 2006. IEEE Jun. 18-22, 2006 p. 1 pp. Digital Object Identifier 10.1109/PES.2006.1709653.*

A Bayesian Method for Transformer Life Estimation Using Perks' Hazard Function Qiming Chen; Egan, D.M.; Power Systems, IEEE Transactions on vol. 21, Issue 4, Nov. 2006 pp. 1954-1965 Digital Object Identifier 10.1109/TPWRS.2006.881129.*

Bond, "Predictive Engineering for Aging Infrastructure," SPIE, 3588, pp. 2-13 (1999).

Eisenmann and Eisenmann Jr., "Machinery Malfunction Diagnosis and Correction," Prentice-Hall, Inc., Saddle River, New Jersey pp. 243-252, 278-284, 294-343, 416-432, 435-440, and 535-545 (1998).

Greitzer et al., "Developments of a Framework for Predicting Life of Mechanical Systems: Life Extension Analysis and Prognostics (LEAP)," SOLE 1999 Symposium, Las Vegas, Nevada, pp. 1-7 (1999).

Holroyd, "The Acoustic Emission & Ultrasonic Handbook," pp. 3-63, Coxmoore Publishing Company, Oxford, England (2000).

Jarrell et al., "Nuclear Plant Service Water Aging Degradation Assessment," NUREG/CR-5379, vol. I, PNL-6560 (Jun. 1989).

Jarrell et al., "Nuclear Plant Service Water Aging Degradation Assessment," NUREG/CR-5379, vol. II, PNL-7916 (Oct. 1992).

Piotrowski, "Shaft Alignment Handbook," pp. 1-13, 137-150, 189-194, 252-272, 277-297, 331-346, 376-384, 507-553, Marcel Dekker, Inc. New York (1995).

Subudhi, "Nuclear Plant Aging Research (NPAR): Summary of Results and Their Utilization," CR-6137 Draft Report, Brookhaven National Laboratory, Brookhaven, New York (1994).

"Erosion by Cavitation of Impingement," ASTM Special Technical Publication No. 408, Atlantic City Symposium Proceedings (1966).

"Process Cost Reduction Through Proactive Operations and Maintenance," State-of-the-Art Report—Food Manufacturing Coalition for Innovation and Technology Transfer, pp. 1-11 (1997).

FlexiForce®: Single Button Force Sensors, ELF™, Economical Load and Force System (introduction material and FAQ) (available at http://www.tekscan.com/flexiforce/flexiforce.html) (accessed on Nov. 21, 2002).

Ludeca: Permalign® Laser Monitoring System (introduction material and slide show), 33 pages (available at http://www.ludeca.com/permalign.htm) (accessed on Dec. 19, 2002).

G.D. Neil, "Detection of incipient cavitation in pumps using acoustic emission," *Proc. Instn. Mech. Engrs.*, 211:267-277 (1997).

"Annex to Form PCT/ISA/206, Communication Relating to the Results of the Partial International Search," from European Patent Office, International Application No. PCT/US02/39464, mailed Apr. 2, 2003.

International Search Report dated Jul. 4, 2001, International Application No. PCT/US/0023389, filing date Aug. 25, 2000.

Written Opinion dated Jan. 19, 2004, International Application No. PCT/US02/39464, filing date Dec. 9, 2002.

International Preliminary Examination Report, dated Mar. 18, 2004, International Application No. PCT/US02/39464, filing date Dec. 9, 2002.

International Search Report, dated Oct. 8, 2003, International Application No. PCT/US 02/39464, filing date Dec. 9, 2002.

* cited by examiner

METHOD AND APPARATUS TO PREDICT THE REMAINING SERVICE LIFE OF AN OPERATING SYSTEM

This invention was made with Government support under Contract DE-AC0676RLO1830 awarded by the U.S. Department of Energy. The Government has certain rights in the invention.

FIELD OF THE INVENTION

The present invention relates to methods and computer-based apparatuses for monitoring the degradation of, predicting the remaining service life of, and planning maintenance for, an operating system. As used herein, the service life of an operating system means the service life of the entire system, a subsystem, or one or more components of the system.

BACKGROUND OF THE INVENTION

Maintenance practice in industry and the military is typically based on one of two strategies: corrective maintenance and preventative maintenance. The first strategy of corrective maintenance entails repairing or replacing components of a system when they fail or when there is significant performance degradation in the system. Furthermore, parts, supplies, personnel, and tools required for corrective maintenance are often not ready or unavailable, causing repairs to be slow and costly, unless maintenance is scheduled in a timely manner.

To some extent, the second strategy of preventative maintenance attempts to reduce this problem by establishing maintenance schedules based upon statistical analysis—such as mean-time-between-failure, or other criteria. Such scheduled preventative maintenance is an inefficient approach for most systems due to the lack of specific information on the condition of the system or of its components. Schedule intervals are typically shortened to significantly reduce the probability of component failure even under the most adverse operating conditions. Consequently, such maintenance practice is costly because components are replaced before replacement is truly necessary and must be performed more often than would be required if the condition of the system was accurately determined (diagnostic analysis) or if reliable predictions about future faults or failures could be made (prognostic analysis). Furthermore, there is a possibility that a component will fail before its schedule interval expires, resulting in more costly, and possibly disastrous, consequences.

Another strategy is condition-based maintenance whose objective is to carry out replacement or repair when component useful life has been realized and before failure occurs. Condition-based maintenance relies on system monitoring and analysis of the monitored data. Diagnostic techniques for analyzing such monitored data include off-line signal processing (e.g., vibration analysis, parametric modeling), artificial intelligence (e.g., expert systems, model-based reasoning), pattern recognition (e.g., statistical analysis techniques, fuzzy logic, artificial neural networks), and sensor fusion or multisensor integration. The specific diagnostic technique, or combination of techniques, that is selected often depends upon the complexity, and knowledge, of the system and its operating characteristics under normal and abnormal conditions. For example, in those circumstances whereby the monitored data are complex-problems that do not have an algorithmic (or engineering rule) solution or for which the algorithmic solution is too complex to be found, an artificial neural network (ANN) is often implemented.

A valuable capability in condition-based maintenance systems would be to accurately predict when the performance of an operating system will degrade to a level requiring maintenance or when failure will occur. Application of such a predictive maintenance strategy would be especially important for high-value/high-cost systems such as the power trains and mechanical equipment used in civilian/military machinery, including that in land-, air-, and sea-based vehicles (e.g., automobiles, trucks, aircraft, ships, locomotives, and earth-moving equipment). For example, there is a need to apply a predictive maintenance strategy to the AGT 1500 gas turbine engine in the M1 Abrams main battle tank (Greitzer et al, "Gas Turbine Engine Health Monitoring and Prognostics," presented at the International Society of Logistics 1999 Symposium, Las Vegas, Nev., Aug. 30-Sep. 2, 1999 and Illi et al, "An Artificial Neural Network System for Diagnosing Gas Turbine Engine Fuel Faults," Advanced Materials and Process Technology for Mechanical Failure Prevention, Proceedings of the 48$^{th}$ Meeting of the Mechanical Failures Prevention Group, April 1994, pp. 359-367). A predictive maintenance strategy would also be beneficial in applications whereby replacement parts are not normally stored on the shelf—that is, in circumstances whereby the replacement parts need a lead time to be ordered, manufactured, or shipped. The strategy also lends itself to preparing maintenance personnel for a pending maintenance task on a certain degrading component or subsystem.

Accordingly, there is a continuing need for a method and apparatus for monitoring, predicting, and/or planning maintenance needs in an operating system.

SUMMARY OF THE INVENTION

The present invention is a method and computer-based apparatus for monitoring the degradation of, predicting the remaining service life of, and/or planning maintenance for, an operating system. Diagnostic information on degradation of the operating system is obtained through measurement of one or more performance characteristics by one or more sensors onboard and/or proximate the operating system. Though not required, it is preferred that the sensor data are validated to improve the accuracy and reliability of service life predictions. The condition or degree of degradation of the operating system is presented to a user by way of one or more calculated, numeric degradation figures of merit that are trended against one or more independent variables (e.g., calendar time, cycles) using one or more mathematical techniques. Furthermore, more than one trendline and uncertainty interval may be generated for a given degradation figure of merit/independent variable data set. The trendline(s) and uncertainty interval(s) are subsequently compared to one or more degradation figure of merit thresholds to predict the remaining service life of the operating system. The present invention enables multiple mathematical approaches in determining which trendline(s) to use to provide the best estimate of the remaining service life.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DETAILED DESCRIPTION OF THE INVENTION

Figure 1:
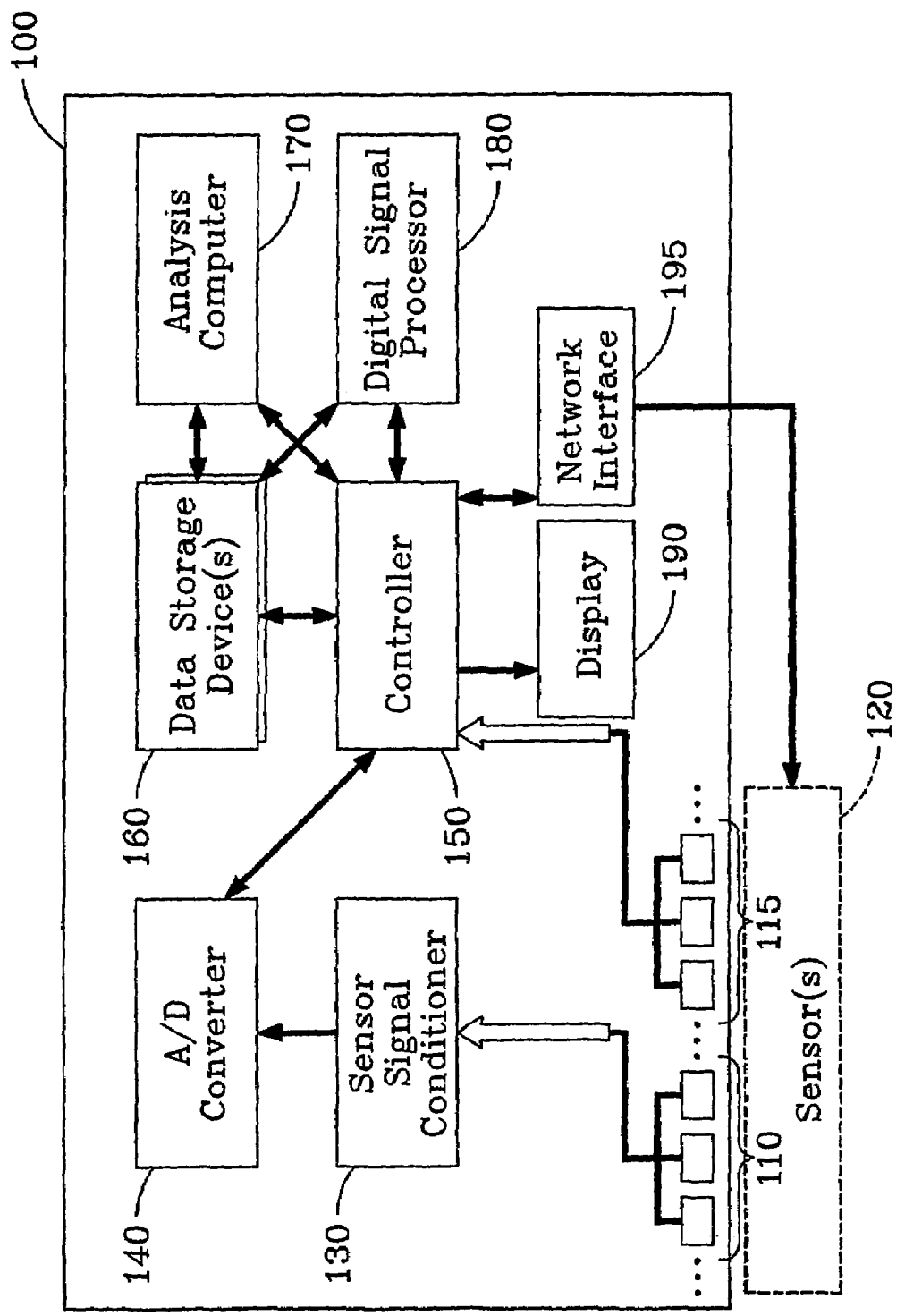
FIG. 1 illustrates the hardware architecture of an embodiment of the present invention.

The present invention is a method and computer-based apparatus for monitoring the degradation of, predicting the remaining service life of, and/or planning maintenance for, an operating system. The operating system may be mechanical, electrical, biological, chemical, or combinations thereof and is not limited to systems with moving components or parts. Examples of mechanical systems include machinery, reciprocating and turbine engines, pumps, engine transmissions, and power generators. Examples of systems without moving components include biological or chemical reaction/processing cells (e.g., fuel cells), electronic devices, and electrical circuitry. It is understood that, while the primary focus of the description herein relates to mechanical systems, the present invention should not be so limited, and operation of other embodiments will be readily apparent to those skilled in the art.

Diagnostic information on degradation of the operating system is obtained through measurement of one or more performance characteristics by one or more sensors. The diagnostic information may be obtained in real time (or near real time), or it may be delayed for convenience. The sensor(s) may be located directly onboard the operating system (e.g., using a thermocouple), may be proximate (e.g., using an infrared temperature sensor), or combinations thereof. Furthermore, some or all of the sensors may be integral with the operating system and not dedicated only to monitoring performance characteristics. For example, the sensors may share the role of monitoring performance and providing system control. The sensors may be, but are not limited to, devices that measure temperature, pressure, vibration, rotational speed (i.e., RPM), strain, fluid viscosity, liquid phase composition especially impurities, gas phase composition, electric current, electric voltage, torque, capacitance, inductance, and combinations thereof.

The condition or degree of degradation of the operating system is presented to a user by way of one or more calculated, numeric degradation figures of merit (hereinafter referred to simply as "FOM"). Just a few examples of FOMs include % efficiency, % leakage, bearing performance loss, oil performance loss, % leakage, change in pressure, and change in temperature. Data from the same sensor may be employed in a number of FOMs. Calculation of the FOM(s) may be by algorithm (including engineering rules), artificial intelligence (e.g., expert systems, model-based reasoning), pattern recognition (e.g., statistical analysis techniques, fuzzy logic, artificial neural networks), and combinations thereof. The FOM(s) is subsequently trended against one or more independent variables such as calendar time, system/component running time, number of system/component starts, stops, or cycles, distance traveled, cumulative RPM, amount of time with the system/component under load, cumulative work performed, and cumulative fuel consumed. Independent variables may also include sensor data and FOM values taken/calculated prior to the desired moment of prediction. Furthermore, more than one trendline and uncertainty interval may be generated for a given FOM/independent variable data set.

The trendline(s) and any uncertainty interval(s) of the FOM(s) are subsequently compared to one or more degradation figure of merit thresholds (hereinafter referred to simply as "threshold"). The threshold signifies an FOM value at which maintenance is required. The threshold, in some circumstances, may represent a threshold at which failure occurs in a non-critical component or subsystem of the operating system. The present invention enables multiple mathematical approaches, including statistical analysis, in determining which trendline(s) to use to provide the best estimate of the remaining service life. The trending may be handled analytically and/or presented visually as a graph of FOM(s) versus the independent variable(s) and the threshold(s).

The selection of the FOM(s) and determination of the threshold(s) depend on the specific operating system and the potential modes of performance degradation or failure. Appropriate FOM(s) for monitoring and for threshold(s) are identified by those skilled in the operation and maintenance of such systems. For example, candidate FOM(s) to be monitored for changes in engine performance may include its operating temperature, bearing performance, maximum engine power, and lubricating oil performance.

One of many embodiments of the present invention uses model-based diagnostics and artificial neural networks to calculate the FOM(s). This combination permits the present invention to model normal machine performance, learn to recognize deviations from normal behavior using the sensor data, and classify these deviations as conditions requiring maintenance attention. It is recognized, however, by those skilled in the art that other diagnostic techniques disclosed in the preceding paragraphs, and combinations thereof, may be used to calculate the FOM(s).

FIG. 1 schematically illustrates one embodiment of the prognostic apparatus 100. The prognostic apparatus 100 comprises one or more sensors that may be analog 110 and/or digital 115 and which monitor performance characteristics of an operating system 120. The sensors 110,115 may be factory-installed or retrofitted to the operating system. The analog sensor(s) 110 may be attached through a wiring harness (not shown) to a sensor signal conditioner 130 which is connected to an analog-to-digital converter (ADC) 140.

The controller (e.g., a microprocessor) 150 manages and controls the digital data traffic amongst the various modules shown in FIG. 1. If a digital sensor(s) 115 is used, it may directly interface with the controller 150 (e.g., through a COM port). The controller 150 collects the sensor 110,115 signals which are subsequently placed in one or more data storage devices (e.g., hard disk, RAM, flash memory card) 160. The controller 150 then notifies the analysis computer 170 and an optional digital signal processor 180 that data is available in the data storage device(s) 160. The digital signal processor 180 may be used in applications requiring ancillary preprocessing of sensor 110,115 signals (e.g., those from a vibration sensor). Furthermore, the controller 150 manages a display 190 and may handle communications with the controls and other components of the operating system 120 through an optional network interface 195.

In the embodiment of FIG. 1, results of the prognostic analysis are communicated to a user through the display 190 by way of warning lights, an alphanumeric display, a graphical user interface, or combinations thereof. The display 190 may be an LCD, CRT monitor, an array of indicator lights, or combinations thereof. The results of the prognostic analysis may also be communicated via telemetry (not shown) to a command/control, or maintenance support, center so that readiness and maintenance needs may be addressed in a timely manner.

As is well known to those skilled in the art, some or all of the components of the prognostic apparatus 100 shown in FIG. 1 may be incorporated in single device (e.g., a personal computer) as other embodiments of the present invention. It is also important to note that the prognostic apparatus 100 is not necessarily an apparatus separate from the operating system. The prognostic apparatus 100 may be fully integrated with the instrumentation, data acquisition/storage/processing, and computer/control/display functions of the operating system 120 to provide continuous, economic, and convenient prognostic capability.

Figure 2A:
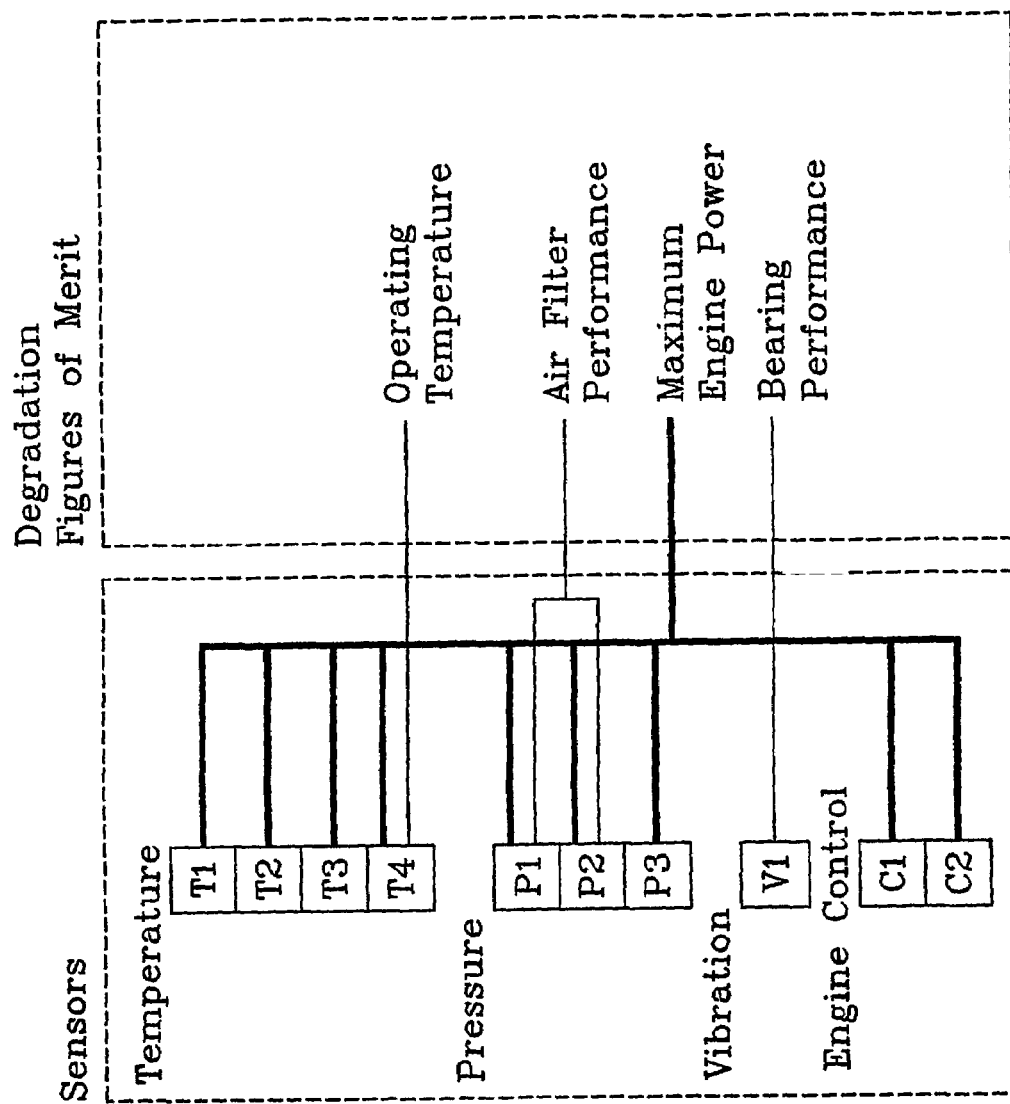
FIG. 2A illustrates an example of how sets of sensors (and their signals) may be mapped to four degradation figures of merit.
Figure 2B:
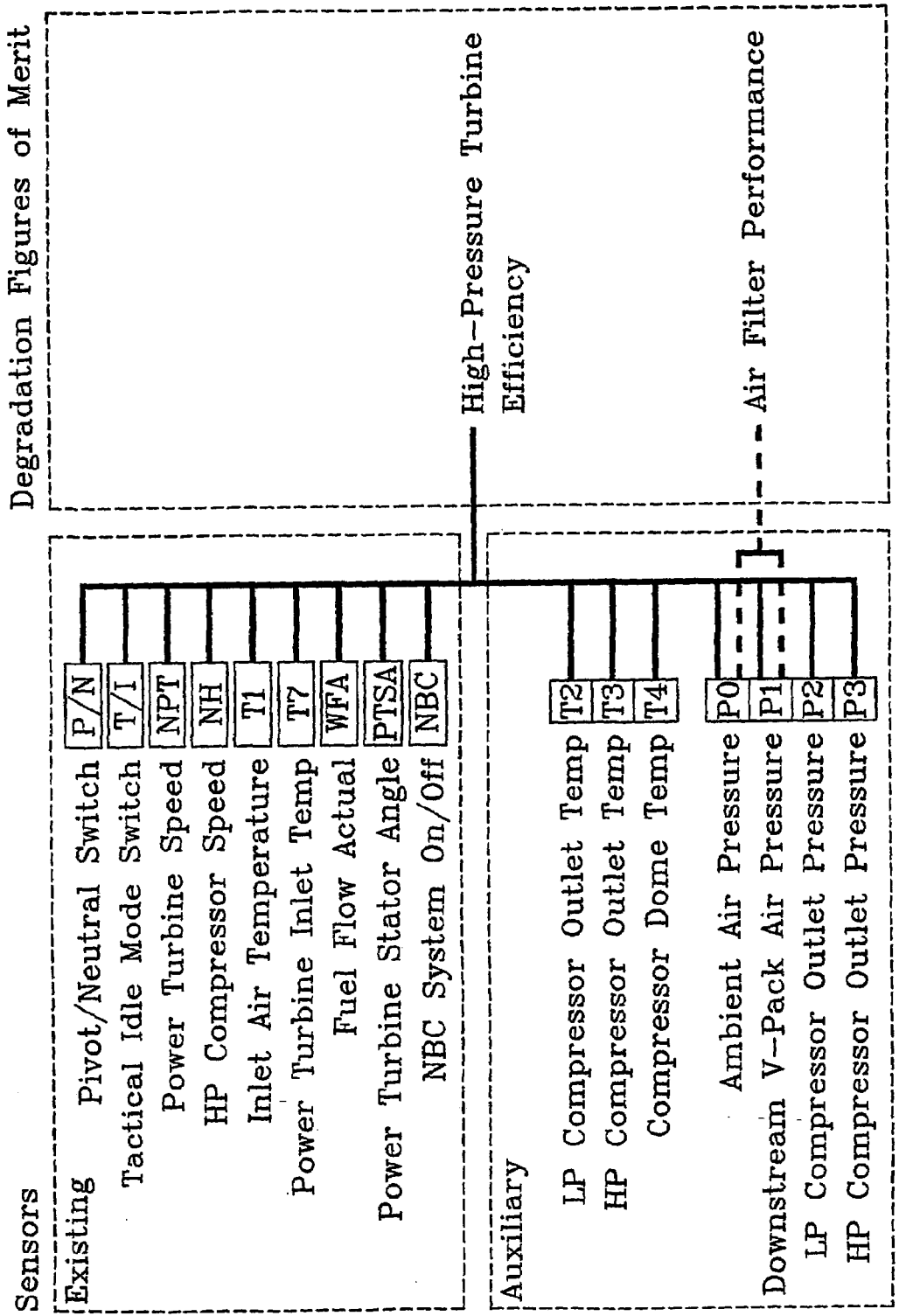
FIG. 2B illustrates another example of how sets of sensors may be mapped to two degradation figures of merit for the M1 Abrams Tank turbine engine.

The software functionality includes scheduling of data collection, sensor validation, signal processing/sensor fusion and analysis, fault diagnostics, prognostics, data storage, and displays/user interfaces. In one embodiment of the present invention, the analysis computer 170 has a first instruction set for computing FOM(s) using sensor data stored on the data storage device(s) 160. For example, an engine may have 10 sensors that are used in the computation of a set of four FOMs as shown in FIG. 2A. A more sophisticated example is shown in FIG. 2B, which shows numerous sensors that are used in the computation of two FOMs for the turbine engine of an M1 Abrams Tank. As discussed earlier, the particular method used to compute the FOM(s) is application-specific. For example, some methods may employ rules and algorithms derived from first-principle thermodynamic characteristics, others may depend upon simulation models, and others may be based on artificial neural networks. A second instruction set within the analysis computer 170 is used for trending the FOM(s). Furthermore, a third instruction set within the analysis computer 170 may be incorporated to validate the sensor data.

Figure 3:
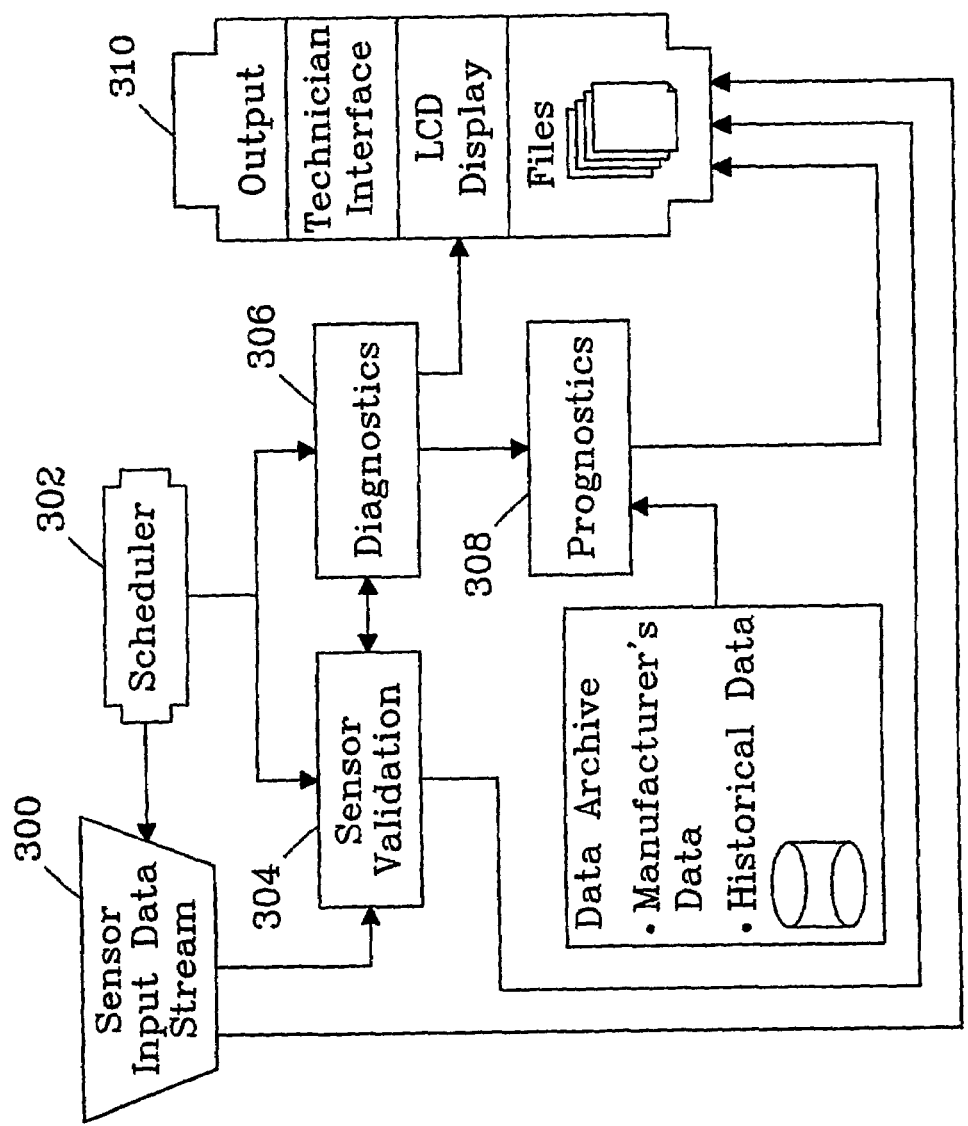
FIG. 3 illustrates the software architecture of an embodiment of the present invention.

The software architecture, shown in FIG. 3, has modules for the Input Data Stream 300, Scheduler 302, Sensor Validation 304, Diagnostics 306, Prognostics 308, and Output 310.

The Input Data Stream 300 makes the sensor data available to the other software modules. It obtains the sensor data, sends the sensor data to Output 310 in order to be written to one or more files, and prepares the sensor data for use by the rest of the software. When sensor data are obtained, the sensor data are typically in terms of voltages or current levels. Other modules typically need these sensor values in different units. For instance, neural network models typically use normalized sensor values and many of the diagnostic rules require sensor values in terms of engineering units. Therefore, as soon as Input Data Stream 300 retrieves the sensor data, it performs these two conversions, normalization and engineering conversions. These sets of sensor values are placed into one or more data structures, where the other software modules can access them.

The Scheduler 302 controls the application of all of the modules. It determines when and how often the Input Data Stream 300 samples data, when Sensor Validation 304 validates the sensor data, when Diagnostics 306 and Prognostics 308 are performed, and when results are Output 310.

Three factors affect the scheduling frequency of the diagnosis of individual operating system conditions. First, the operating system often behaves differently at different system states. For instance, turbine engine characteristics vary between idling and full speed. Thus, six turbine engine states may be identified for separate diagnoses (e.g., start sequence, tactical idle, low idle, intermediate power, full power, and coast down). An embodiment of the present invention first determines the system state and then schedules the appropriate diagnostics. Second, it is not always possible to diagnose every condition at every second that meets the above-criteria. The schedule parameters must be set for each application, depending on the type of sensor data. For example, turbine engine vibration data may be collected for a sampling period on the order of 1 second but may be collected infrequently (e.g., once every 30 minutes). On the other hand, temperatures and pressures may be collected instantaneously at one-second intervals. Third, the operating system is often in transition, changing from one state to the next (e.g., when the M1 Abrams Tank turbine engine is transitioning from tactical idle to low idle). Diagnostics processing may be interrupted until the sensor readings have stabilized in the next system state.

In addition to controlling the data acquisition process, the Scheduler 302 controls Sensor Validation 304, Diagnostics 306, Prognostics 308, and Output 310. The Scheduler 302 also controls the writing of data to one or more files and shutting down the software at the conclusion of a run.

Figure 4:
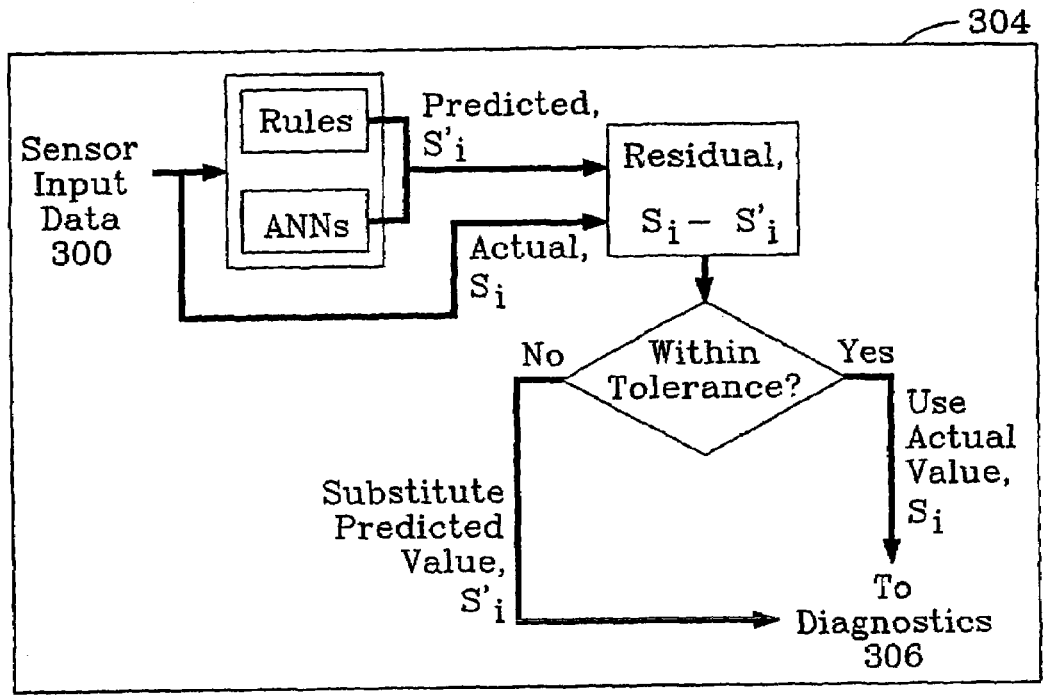
FIG. 4 is a schematic illustrating an example of the sensor validation process that may be used in FIG. 3.

Sensor validation 304 entails validating the measured sensor values to be within expected operating ranges to ensure that prognostics is based on best possible sensor data. An example of a sensor validation algorithm, shown schematically in FIG. 4, compares each measured sensor value, $S_i$, to a predicted value, $S_i'$. The differences (or residuals) are compared to given tolerances. A tolerance is determined for each measured sensor value based on the uncertainty and operating ranges of the individual sensor. If the residual is within the tolerance, then the measured sensor value is valid. If the residual is outside the tolerance, the predicted value may be substituted for the sensor value and an event automatically recorded (as a failed sensor) to notify the user or others (e.g., maintenance personnel).

As shown in the example of FIG. 4, two methods may be used to obtain these predicted sensor values, $S_i'$: rule models and neural network models. Relatively simple rules are sufficient for predicting some sensor values. These rules can be expressed in terms of well-defined relationships among other sensor values. As known to those skilled in the art, artificial neural networks may be used to predict the sensor values that have more complex relationships with other sensor values.

The validated sensor values are subsequently passed to Diagnostics 306 whereby the present invention computes one or more FOMs that represent the degree of degradation of the operating system (e.g., % efficiency, % leakage, $\Delta p$, or $\Delta T$). In most instances, it is preferred that these FOMs are continuous, or near-continuous, so that they can be used effectively to perform trending in Prognostics 308.

Figure 5:
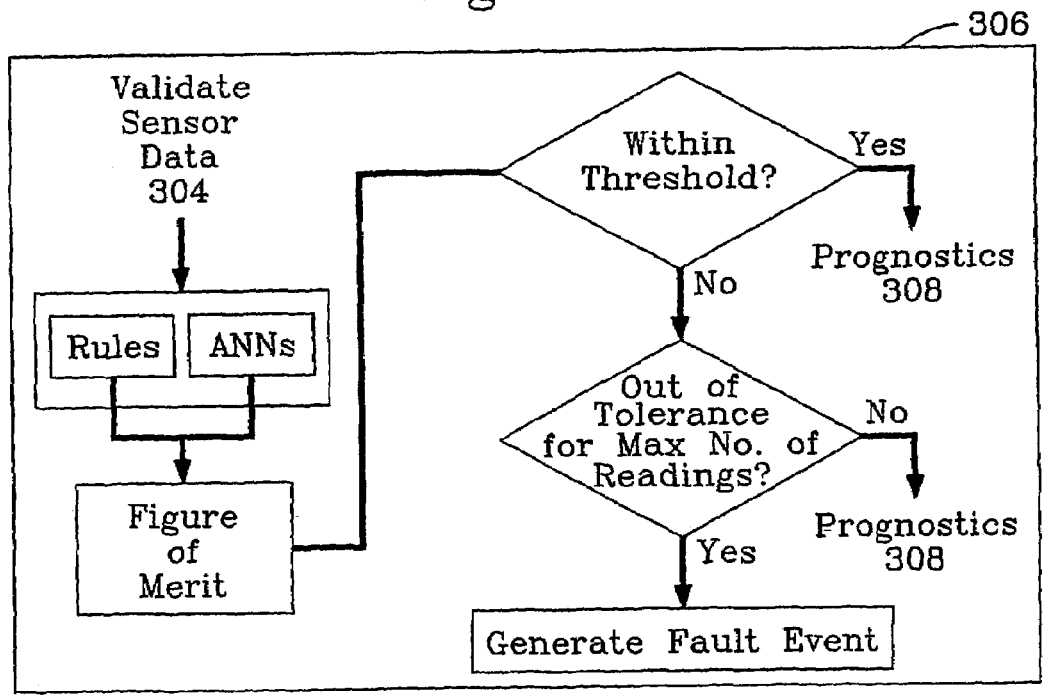
FIG. 5 is a schematic illustrating an example of the diagnostic process that may be used in FIG. 3.

As exemplified in FIG. 5, two methods may be used to obtain the FOM(s): rule- and neural network based diagnostics. Relatively simple rules are sufficient for diagnosing some conditions. Rule-based diagnostics are typically used when only one or a few sensor values are involved and determinations are possible with well-defined algorithms and comparisons with limits or ranges. Examples include rules that generate fault calls or alarms when critical oil and gas temperatures, oil pressures, or when certain "abuse" events are detected. Abuse events refer to operating conditions that can potentially damage components of the operating system (e.g., failing to allow a turbine engine to cool down sufficiently prior to shutting it down).

Some conditions are too complex to be diagnosed with rules. These conditions reflect the relationship between many sensor values that are difficult to define by algorithms. An example condition in the M1 Abrams Tank turbine engine that requires the use of neural network based diagnostics is high pressure turbine efficiency loss. This condition is determined from many thermodynamic sensor signals from the engine. Therefore, it is impractical to derive one rule that could represent this condition. By using data for which this condition is known, the neural network is trained to recognize this condition in the future.

For a turbine engine, the method and apparatus of the present invention is capable of checking many conditions/faults through the diagnostic procedures (the number of conditions evaluated is dependent upon the speed of the processor and the desired frequency of checking for faults). These conditions can be grouped into two categories. First, there are conditions that have a direct impact on the maximum horsepower available in the engine. Examples of these conditions are compressor efficiencies and valve leakage. Second, there are conditions that do not affect the engine horsepower output, but may indicate or lead to serious mechanical failures. Examples of these conditions are oil consumption and increased chip detection in oil.

Once a series of FOM values for a particular degradation is obtained (e.g., either by a rule or a neural network) for a specific condition, the trendline of that FOM is compared against its threshold. For each particular degradation, a threshold (either upper or lower) is determined for which the system condition should not cross. For example, for a condition that affects a turbine engine horsepower output, the threshold may be specified as the level where the total turbine engine horsepower is reduced to 60%. Other conditions are based on different criteria, such as the maximum allowed oil consumption in an hour or the maximum frequency of chip detector zaps. The thresholds for these types of conditions are typically based on current field maintenance guidelines and/or engineering judgment.

The fact that an FOM trendline intermittently crosses a threshold is not necessarily enough to indicate that the associated component requires maintenance. Crossing the threshold could be a consequence of noise in the sensor signals. The present invention may require that a diagnostic condition cross the threshold for a specified time period before a maintenance requirement is declared. The number of consecutive readings for which a condition has exceeded the threshold may be recorded and when that number exceeds an allowed time period an event is generated. This maximum allowed time period varies between conditions.

To predict a failure (failure being defined as the inability of the operating system to perform its intended function and thus requiring maintenance) in Prognostics 308, it is typically necessary to know three things: (1) knowledge of the system's current degree of fault, (2) a theory about the progression of the fault, so as to postulate the system's degree of fault at a particular point in time in the future, and (3) if that level of fault will produce a failure of the operating system. This last item is the threshold, the magnitude of FOM that will lead to system failure. Archived-manufacturer's-data and/or historical data may be used, in addition to engineering judgment, to help determine the threshold.

Figure 6:
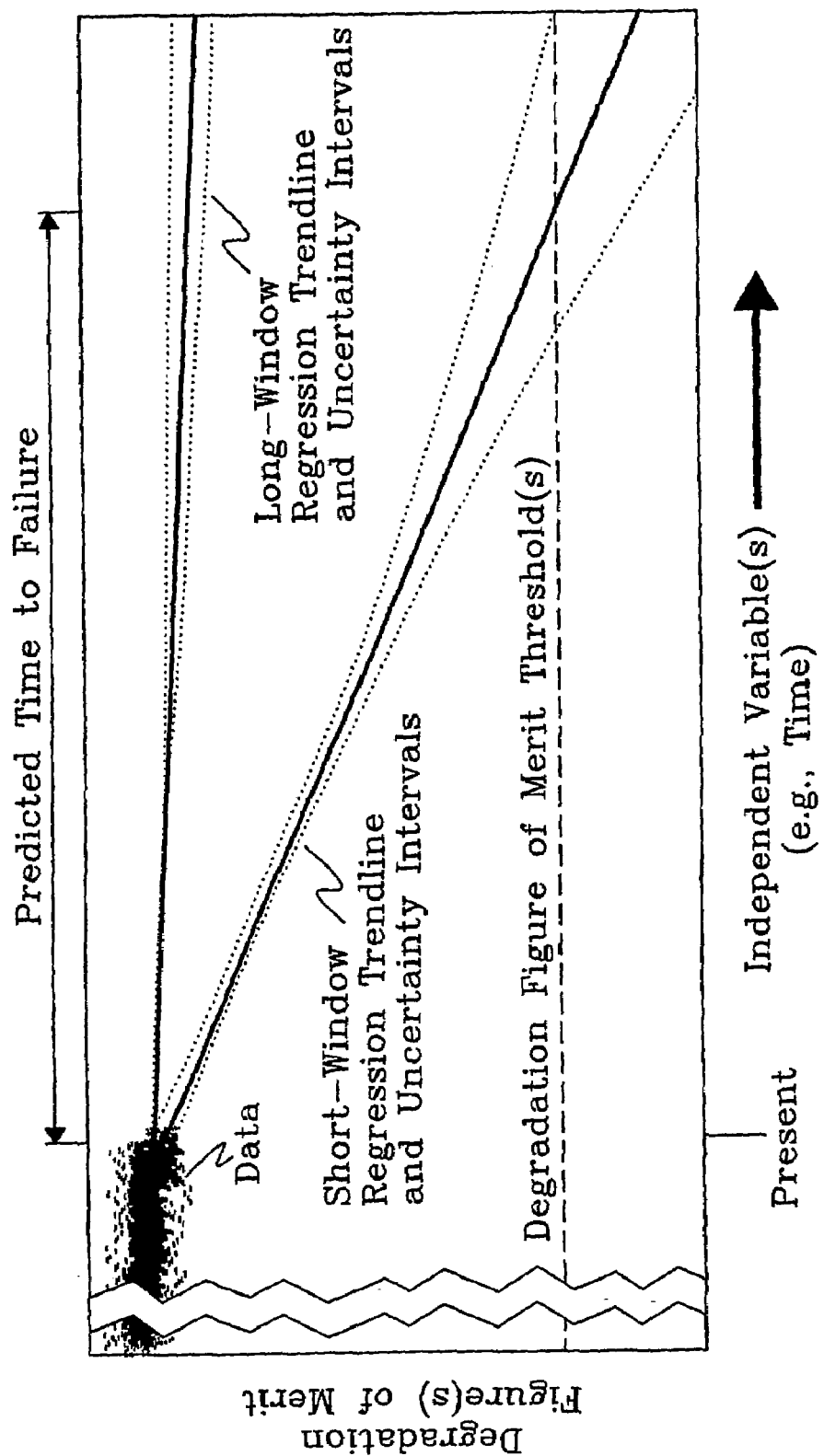
FIG. 6 is a visual representation of multiple trendlines using data from a single degradation figure of merit/independent variable data set to estimate the remaining service life of an operating system.

For each type of fault, the present invention uses the value of the current FOM, the rate of change in that FOM, and the threshold, to compute the operating system's remaining life. In one embodiment of the present invention, the FOMs are trended using a novel "LEAP-Frog" technique described in detail as follows and illustrated in FIG. 6. For each FOM, the analysis computes a plurality of regression lines that differ in the amount of past data that are included in the analysis (i.e., the size of the "window"). The regression lines may differ in slope and amount of error (e.g., extent of the uncertainty intervals) because they reflect differing window sizes. In general, regression lines built from longer windows will be more reliable (lower uncertainty), except when the operating system conditions are changing. In such cases, shorter windows (based on more recent data) will produce more accurate and reliable predictions. The basis of this methodology is to select from among the plurality of regression lines the regression line for a given FOM that exhibits a realistic compatibility with the most recent FOM values. Should a recent set of FOM values be unrealistically high or low, a shorter window (i.e., one more responsive to changes in trends) is tested for realistic compatibility. In this way, the selected regression line for each analysis cycle may jump from one line to another (hence the term "leap"). A more detailed description of the concepts behind the method and the method itself is provided below.

The technique utilizes the following concepts:

Quantification of the Operating System Condition Using FOM(s)

As discussed earlier, the FOM(s) may be presented in several ways: as a singular variable that is measured, such as oil temperature; as a function of a few variables, such as pressure across an air filter; or it may be derived from many variables.

Use of One or Multiple Independent Variables that Might Facilitate the Prediction In addition to what has been previously disclosed herein, these variables may be obtained from sensor data, operating system imbedded processing units, or manual entry. They may be derived using mathematical means as well as engineering insight. Use of Principle Component Analysis, Factor Analysis or any other mathematical/statistical tools are practical methods to supplement the set of independent variables.

Use of a Trending Technique

Mathematical techniques such as regression analysis, Bayesian analysis, time series analysis, linear/non-linear analyses, and Kalman Filtering can provide an estimate of the future condition of the operating system. This prediction can be based on past maintenance and repair data, data from similar operating systems, modeling and simulation data of the system, prior beliefs, or past sensor data. The techniques may perform a prediction alone or a prediction with uncertainty limits.

Use of Multiple Trendlines and Weighting

When multiple trendlines are used, data may be used to weight the trendlines (and/or effectively eliminate unrealistic or unsatisfactory trendlines) based on the performance of the operating system in the current environment and prior beliefs as to the state of the trendline. The multiple trendlines may be based, but are not limited to, different window sizes or different amounts of weighting on the independent variables. This weighting may be ad hoc, empirically driven, or formally derived, such as would be done by a Bayesian analysis.

Trendline Weighting Assessment.

Adjusting the weights on multiple trendlines may be done formally, such as using a Bayesian prior, or it may be performed ad hoc. There are many ways to assess the quality of fit of a trendline. The present invention includes a method that focuses on the most recent data points (for example, the last 100 or the last 1000). One can then use methods that look at the value of a FOM at a recent moment in time compared to the predicted value, or the distribution of predicted values about that time. One simple and concrete way to do this is to compare the value of each FOM with the $20^{th}$ percentile and $80^{th}$ percentile estimates from the distribution of predicted values at that moment in time. Then by comparing the number above the $20^{th}$ percentile to a binary distribution one can tell if this is unusual. A similar comparison can be done with the $80^{th}$ percentile. If the recent FOMs are unusual by this method, one could deem this predictive method unacceptable and assign it a weight of zero. One could also use this method to calculate a probability of a fit, which would be a factor in the weighting of the methods.

Figure 7:
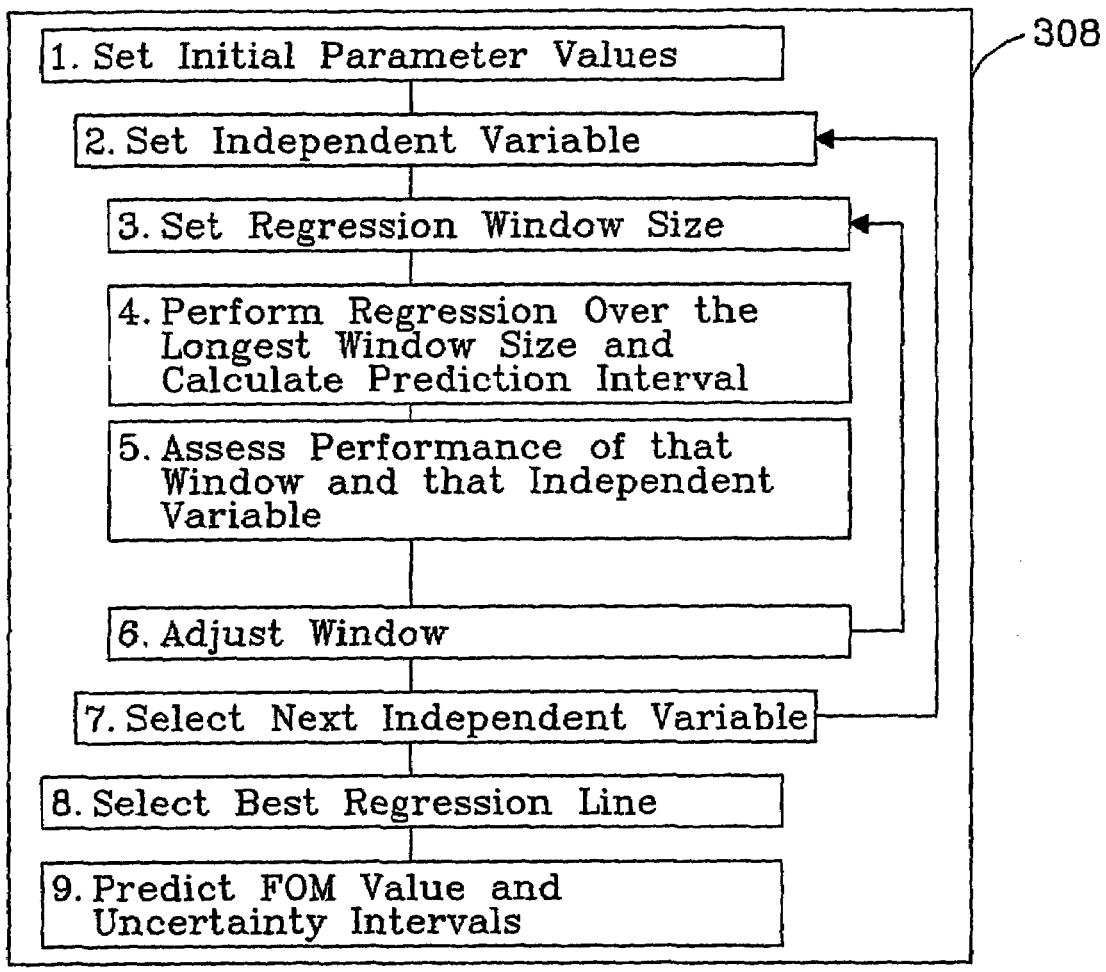
FIG. 7 is a schematic illustrating an example of the steps in statistical analyses for trending and predicting.

These concepts are the basis for the LEAP-Frog process, which is illustrated diagrammatically in FIG. 7 and briefly described by the following steps:
1. Set Initial Parameter Values: Processing uncertainty and prediction interval sizes, quality of fit measures, accumulators.
2. Set Independent Variable: Any of a number of alternative independent variables are possible.
3. Set Window Size: This refers to the sample size used to compute the regression. The LEAP-Frog method uses many different window sizes to compute regression lines.
4. Perform Regression over the longest window size and calculate prediction interval over the last "few" records.
5. Assess performance of that window and that independent variable: Compute a measure of probability of last "few" data values given the prediction interval.
6. Adjust window size. Repeat steps 3-5 as needed.
7. Select next independent variable. Repeat steps 3-6 as needed.
8. Select the best regression line among the different window sizes and independent variable alternatives: Select longest window with the last "few" data records compatible with the quality assessment window.
9. Predict FOM value and uncertainty intervals using the selected regression line. Display or report results as appropriate.

These steps are performed for each condition being monitored. Each time an FOM is generated in Diagnostics 306, Prognostics 308 is called for that condition. An exception is that some conditions may not be trended because their FOMs are not represented as continuous or near-continuous numerical values.

When the diagnostic points are generated in Diagnostics 306, they may only apply under specific operating system states. For example, if a condition was diagnosed under three different states, there may be three different diagnostic points generated to represent the condition or there may be one diagnostic point representing a weighting of those points. If all three diagnostic points are generated, then each of these diagnostic points is trended using the steps described above, all representing the same condition. Statistical uncertainty intervals may be computed on the expected time to failure for each state that is trended. This is the time period from the present time to where the trend line intersects the threshold.

Different decision rules may be devised for selecting the overall operating system's predicted time to failure. For example, a simple rule may be used such that predicted time to failure is the minimum of the times to failure across all conditions being monitored and all of the computed states. A more sophisticated rule would take uncertainty intervals into account (e.g., using the trendlines for the various states and weighting the combination of those trendlines proportionally to the projected "time" in each state over the time from now to anticipated failure, and recalculating the uncertainty interval on the combined prediction).

Events and results of the analysis are presented in various forms in the Output 310 (FIG. 3). An event may be generated when one of the four situations occur:
(1) A sensor is determined invalid,
(2) A fault is diagnosed (i.e., the FOM value crosses a threshold for a certain length of time),
(3) The prediction about time to failure for any condition changes from one time range to another, and
(4) An abuse event is detected.

All events are written out to an Output 310 file when they occur. A maintenance diagnostician can later review the events file offline to determine exactly what occurred during that run. Some events may also be sent to the user or system operator (e.g., the driver of a tank or automobile) via the display 190.

The software may display only the most critical information to a user, such as the operating system's health check power rating, FOM(s), predicted remaining service life, or any critical diagnostic alerts. For maintenance personnel, the software may display status summary information for faults, graphs of FOM(s) trendline(s)/threshold(s), predicted remaining service life, graphs of sensor data streams, alphanumeric readouts, an operating system duty factor summary, graphical display of temperatures and pressures, and more detailed diagnostic output of the artificial neural network systems. Providing status and predictive information in this way can facilitate tactical and logistics planning—for example, enabling tactical commanders to assign vehicles to engagements based on expected operational readiness, and enabling logistics/maintenance planners to schedule maintenance or order replacement parts.

CLOSURE

While embodiments of the present invention have been shown and described, it will be apparent to those skilled in the art that many changes and modifications may be made without departing from the invention in its broader aspects. The appended claims are therefore intended to cover all such changes, modifications, and equivalents as fall within the true spirit and scope of the invention.

What is claimed is:

1. A computer-implemented method for predicting the remaining service life of an operating system, comprising the steps of:
   obtaining data from at least one sensor that measures at least one performance characteristic of said system during operation;
   calculating at least one degradation figure of merit using data from said at least one sensor;
   trending said at least one degradation figure of merit against at least one independent variable relative to at least one degradation figure of merit threshold, thereby generating multiple trendlines;
   weighting said multiple trendlines by setting weights for said multiple trendlines;
   combining said multiple trendlines into a single trendline based on said weights; and responsive to said trending, said weighting, and said combining, estimating the remaining service life of said system.

2. The method of claim 1, further comprising the step of validating said data prior to calculating said at least one degradation figure of merit.

3. The method of claim 1, wherein calculating said at least one degradation figure of merit employs a diagnostic technique selected from algorithm, artificial intelligence, pattern recognition, and combinations thereof.

4. The method of claim 1, wherein said system is mechanical.

5. The method of claim 4, wherein said system is an internal combustion engine.

6. The method of claim 4, wherein said system is a turbine engine.

7. The method of claim 1, wherein said system is a fuel cell.

8. The method of claim 1, wherein said trending is performed using at least one mathematical technique, the selection thereof dependent upon the degree of change in the degradation figure of merit with said independent variable.

9. The method of claim 8, wherein said at least one mathematical technique is selected from regression analysis, Bayesian analysis, time series analysis, linear analysis, non-linear analysis, and Kalman Filtering.

10. The method of claim 1, wherein said trending comprises
    (a) generating said multiple trendlines using a plurality of window sizes for a given independent variable;
    (b) assessing performance of said multiple trendlines; and
    (c) selecting a regression trendline.

11. The method of claim 10, further comprising the steps of:
    selecting another independent variable before step (c) and repeating steps (a) and (b).

12. The method of claim 1, wherein said at least one sensor comprises at least two sensors that measure at least two different performance characteristics.

13. A computer-implemented method for planning maintenance for an operating system, comprising the steps of:
    obtaining data from at least one sensor that measures at least one performance characteristic of said system during operation;
    calculating at least one degradation figure of merit using data from said at least one sensor;
    trending said at least one degradation figure of merit against at least one independent variable using a plurality of window sizes for said at least one independent variable to produce a plurality of regression trendlines;
    assessing performance of said plurality of regression trendlines;
    responsive to said assessing, assigning weights to said plurality of regression trendlines;
    selecting a regression trendline based on said weights; and
    communicating at least one of the plurality of regression trendlines to a person to inform the person of any degradation and associated maintenance needs in the future.

14. The method of claim 13, further comprising the steps of trending said at least one degradation figure of merit against at least one degradation figure of merit threshold and further communicating said at least one degradation figure of merit threshold to the person.

15. The method of claim 13, wherein said communicating is performed by telemetry.

16. A computer-implemented method for monitoring the degradation of an operating system and communicating the degradation to a user, comprising the steps of:
    obtaining data from at least one onboard sensor that measures at least one performance characteristic of said system during operation;
    calculating a plurality of degradation figures of merit using data from said at least one sensor; and
    generating a plurality of regression trendlines using respective degradation figures of merit;
    assessing performance of said plurality of regression trendlines;
    responsive to said assessing, selecting a regression trendline; and
    displaying said selected regression trendline to the user of said operating system.

17. The method of claim 16, wherein calculating said at least one degradation figure of merit employs a diagnostic technique selected from algorithm, artificial intelligence, pattern recognition, and combinations thereof.

18. The method of claim 16, further comprising the step of displaying at least one degradation figure of merit threshold to the user.

19. The method of claim 16, further comprising the step of validating said data prior to calculating said at least one degradation figure of merit.

20. An apparatus for monitoring the degradation of an operating system and communicating the degradation to a user, comprising:
    at least one onboard sensor that measures at least one performance characteristic of said system during operation;
    a computer for receiving said sensor data;
    a first instruction set within said computer for calculating at least one degradation figure of merit using said sensor data;
    a second instruction set within said computer for trending said at least one degradation figure of merit against at least one independent variable relative to at least one degradation figure of merit threshold to generate at least one trendline and to estimate the remaining service life of said system; and
    a display for communicating said at least one degradation figure of merit as a function of at least one independent variable to the user of said operating system.

21. The apparatus of claim 20, wherein said display further communicates at least one degradation figure of merit threshold to the user.

22. The apparatus of claim 20, wherein said system is mechanical.

23. The apparatus of claim 22, wherein said system is an internal combustion engine.

24. The apparatus of claim 22, wherein said system is a turbine engine.

25. The apparatus of claim 20, wherein said system is a fuel cell.

26. An apparatus for predicting the remaining service life of an operating system, comprising:
    at least one sensor that measures at least one performance characteristic of said system during operation;
    a computer for receiving said sensor data;
    a first instruction set within said computer for calculating at least one degradation figure of merit using said sensor data;
    a second instruction set within said computer for trending said at least one degradation figure of merit against at least one independent variable relative to at least one degradation figure of merit threshold to generate at least one trendline and to estimate the remaining service life of said system;

a third instruction set within said computer for validating said sensor data; and a fourth instruction set within said computer for assessing performance of said trending and for selecting a trendline from said at least one trendline based on said assessing.

27. The apparatus of claim 26, wherein said third instruction set for validating said sensor data includes instructions for comparing said sensor data to predicted sensor values based on a tolerance parameter.

28. The apparatus of claim 26, wherein said first instruction set employs a diagnostic technique selected from algorithm, artificial intelligence, pattern recognition, and combinations thereof.

29. The apparatus of claim 26, wherein said second instruction set employs at least one mathematical technique, the selection thereof dependent upon the degree of change in the degradation figure of merit with its independent variable.

30. The apparatus of claim 26, wherein said at least one sensor comprises at least two sensors that measure at least two different performance characteristics.

31. A computer-implemented method for planning maintenance for an operating system, comprising the steps of:

obtaining data from at least one sensor that measures at least one performance characteristic of said system during operation;

calculating at least one degradation figure of merit using data from said at least one sensor;

trending said at least one degradation figure of merit against at least one independent variable to produce a plurality of trendlines;

setting weights for said plurality of trendlines and combining two or more of said plurality of trendlines into a single trendline based on said weights; and communicating said single trendline.

32. A computer-implemented method for monitoring the degradation of an operating system and communicating the degradation to a user, comprising the steps of:

obtaining data from at least one onboard sensor that measures at least one performance characteristic of said system during operation;

calculating at least one degradation figure of merit using data from said at least one sensor, wherein said degradation figure of merit is calculated for various states of said operating system;

trending said degradation figure of merit against at least one independent variable for respective states of said operating system to produce a plurality of trendlines;

setting weights for said plurality of trendlines;

combining two or more of said plurality of trendlines into a single trendline based on said weights; and displaying said at least one degradation figure of merit as a function of at least one independent variable, or displaying said single trendline.

33. The apparatus of claim 20, further comprising a third instruction set within said computer for assessing performance of said trending and for selecting a trendline from said at least one trendline based on said assessing.

34. The apparatus of claim 26, wherein said fourth instruction set comprises instructions for setting weights for said at least one trendline based on said assessing.

35. The apparatus of claim 26, further comprising:

a display for communicating said at least one degradation figure of merit as a function of said at least one independent variable to a user of said operating system.

\* \* \* \* \*